Feb. 13, 1934.    R. C. COUPLAND    1,946,484

RATE MECHANISM

Original Filed April 2, 1929

Inventor
Richard C. Coupland

W.N. Roach
Attorney

Patented Feb. 13, 1934

1,946,484

UNITED STATES PATENT OFFICE 1,946,484

RATE MECHANISM

Richard C. Coupland, United States Army, Norfolk, Va.

Original application April 2, 1929, Serial No. 351,897. Divided and this application March 31, 1932. Serial No. 602,364

3 Claims. (Cl. 264—9)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a rate mechanism and is a division of copending application, Serial No. 351,897 filed April 2, 1929.

The purpose of the invention is to provide a positively driven, mechanical rate mechanism. It consists generally in the provision of a series of slides presented successively at a constant speed to a pinion which is capable of displacing the slides axially. A member continuously receiving the displacement of the slides is therefore moved a distance proportional to the speed of the pinion during the interval that a slide is presented to the pinion.

With the foregoing and other objects in view, the invention resides in the novel arrangement and combination of parts and in the details of construction hereinafter described and claimed. It being understood that changes in the precise embodiment of the invention herein disclosed may be made within the scope of what is claimed without departing from the spirit of the invention.

A practical embodiment of the invention is illustrated in the accompanying drawing, wherein.

Figure 1:
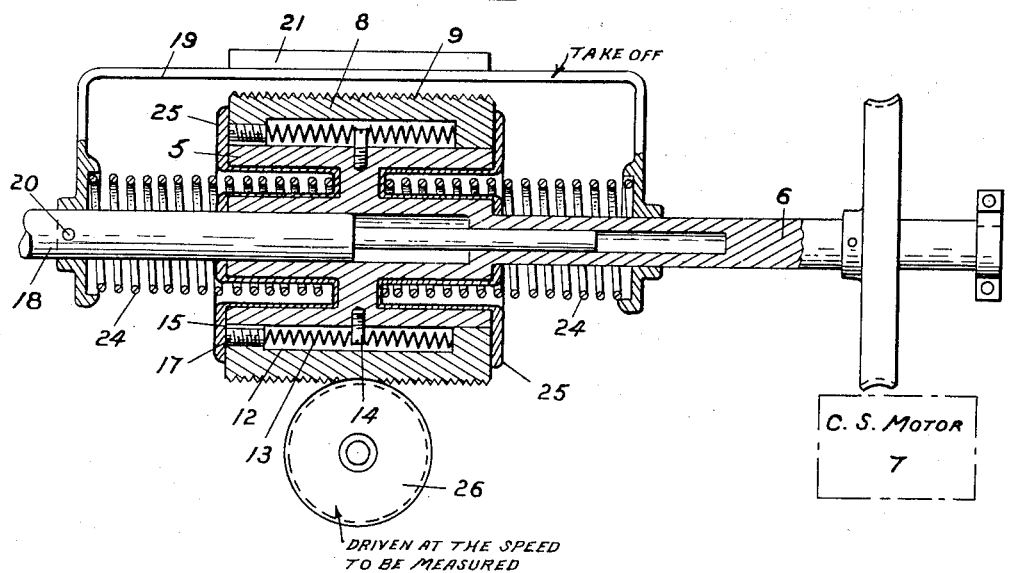
Fig. 1 is a longitudinal sectional view of the rate mechanism, showing the slides in neutral position.
Figure 2:
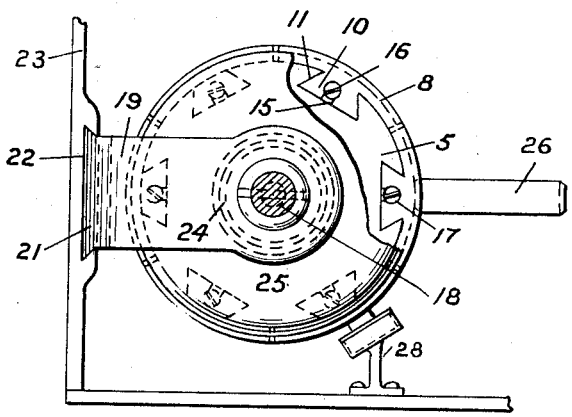
Fig. 2 is a view in end elevation.
Figure 3:
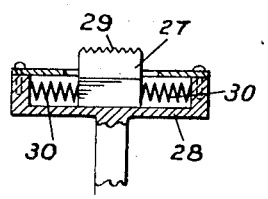
Fig. 3 is an enlarged detail view of the pawl.

Referring to the drawing by numerals of reference, the rate mechanism comprises a drum 5 whose driven axis is a shaft 6 operated by a constant speed motor generally indicated at 7.

A plurality of similar slides 8 having rack teeth 9 are arranged about the periphery of the drum and are mounted for longitudinal movement parallel to the axis of the drum by means of a tongue 10 fitting in a groove 11 of the drum. Each tongue is formed with a recess or channel 12 intermediate its ends for housing a pair of helical springs 13—13. When the parts are assembled the pair of springs are divided by and seated on a pin 14 secured to the drum and projecting into the groove 11.

One end of the tongue is formed with a keyhole slot 15 the cylindrical portion 16 of which is tapped and is continuous with the spring recess 12. In assembling the slide to the drum the key-hole slot 15 admits the pin 14. The portion 16 of the slot permits the introduction of one of the springs 13 and receives a screw 17 whereby this spring is retained. The screw also serves for adjusting the loading of the springs.

Slidably mounted in the shaft 6 is a rod 18 to which the longitudinal displacement of the individual slides 8 is to be continuously communicated. Inasmuch as this displacement may be in opposite directions the connection between the slides 8 of the rod 18 is established through a bridge 19 one end of which embraces and is secured to the rod 18 by means of a pin 20 and the other end is slidably mounted on the shaft 6. The bridge is formed with a tongue 21 slidable in a groove 22 in a supporting member 23. The ends of the bridge confine springs 24—24 whose inner ends are seated on pressure plates 25—25 one at each end of the drum and extending over all of the slides.

The mechanism for displacing the slides 8 consists of a pinion 26 whose rate of movement is to be interpreted in the misplacement of the rod 18.

In order that a slide 8 when displaced by the pinion 26 may be held in the position of its displacement while the pinion is acting on a succeeding slide, there is provided a pawl 27 mounted in a bracket 28 secured to the supporting members 23. The pawl is positioned at a predetermined distance from the pinion, preferably slightly less than the width of one slide and in position to have its teeth 29 mesh with the teeth 9 on the slides. The pawl may be rigidly mounted but is preferably held in a balanced or neutral position by opposite springs 30 which have sufficiently greater strength than the springs 13 to insure retention of the slide in the displaced position so long as the pawl is in engagement therewith.

In operation the motor 7 running at a predetermined and constant rate of speed rotates the drum 5 at a known and constant rate. If the pinion 26 is stationary the slides 8 will remain in their normal position during rotation of the drum. If the pinion is being rotated it will displace the engaged slide 8 in a direction corresponding to the direction of rotation of the pinion. This movement of the slide will be a measure of the angular movement of the pinion during the time that the particular slide is passing in mesh with the pinion. In other words it will be proportional to the speed of the pinion and the peripheral speed of the slide. As one slide becomes disengaged from the pinion the succeeding slide in neutral position becomes engaged. In order to prevent fluttering of the bridge 19 and rod 18 to which the movement of the slides is transmitted, the first slide will be held in its most advanced position by the stop pawl 27 and it will not be released until a succeeding slide has been engaged by the pinion, by virtue of the revolution of the drum 5. When a slide has passed from engagement with both the pinion and the pawl it is immediately restored to neutral position through the action of the springs 13.

An example of one application of the rate mechanism is given in the patent application in connection with a compensating gun sight where the movement of a gun or sighting member in following a moving target supplies the driving force for the pinion 26 and affords a measure of the relative rate of angular travel of the target. The displacement of the rod 18 is transmitted to a sighting system or line of sight and establishes the amount of "lead" to be applied to the gun.

The mechanism may also be employed in various types of integrating devices and for the measurement of angular velocities.

I claim:

1. A rate mechanism including a shaft adapted to be driven at a constant speed, a drum fast on said shaft, a plurality of racks mounted on the periphery of the drum for movement longitudinally thereof, springs engaging opposite end portions of the racks and normally maintaining the racks in neutral position, a pressure plate at each end of the drum overlying the ends of the racks, a bridge having ends spaced from the pressure plates, resilient means between each pressure plate and each adjacent bridge end, a gear the rate of which is to be indicated by said bridge positioned to mesh with the racks for displacing them longitudinally of the drum, and means for temporarily holding a rack in the position of its displacement.

2. A rate mechanism including a shaft adapted to be driven at a constant speed, a drum fast on said shaft, a plurality of racks mounted on the periphery of the drum for movement longitudinally thereof, springs engaging opposite end portions of the racks and normally maintaining the racks in neutral position, a pressure plate at each end of the drum overlying the ends of the racks, a bridge having ends spaced from the pressure plates, resilient means between each pressure plate and each adjacent bridge end, and a gear the rate of which is to be indicated by said bridge positioned to mesh with the racks for displacing them longitudinally of the drum.

3. A rate mechanism including a cylinder adapted to be driven at a constant speed, a plurality of racks mounted on the periphery of the cylinder for movement longitudinally thereof, means for normally holding the racks in neutral position, a pressure plate at each end of the drum overlying the ends of the racks, a member receiving the movements of the pressure plates, and a gear the rate of which is to be indicated by said member mounted in position to mesh with the racks.

RICHARD C. COUPLAND.